(12) United States Patent
Hillenbrand

(10) Patent No.: US 10,381,853 B2
(45) Date of Patent: Aug. 13, 2019

(54) SWITCH-ON DELAY FOR INTRINSICALLY-SAFE BATTERY CELLS

(71) Applicant: Robert Bosch GmbH, Stuttgart (DE)

(72) Inventor: Philipp Hillenbrand, Neuffen (DE)

(73) Assignee: Robert Bosch GmbH, Stuttgart (DE)

( * ) Notice: Subject to any disclaimer, the term of this patent is extended or adjusted under 35 U.S.C. 154(b) by 142 days.

(21) Appl. No.: 15/542,712

(22) PCT Filed: Dec. 16, 2015

(86) PCT No.: PCT/EP2015/079919
§ 371 (c)(1),
(2) Date: Jul. 11, 2017

(87) PCT Pub. No.: WO2016/113061
PCT Pub. Date: Jul. 21, 2016

(65) Prior Publication Data
US 2018/0006481 A1    Jan. 4, 2018

(30) Foreign Application Priority Data

Jan. 14, 2015 (DE) .................. 10 2015 200 442

(51) Int. Cl.
*H02J 7/00*       (2006.01)
*H02J 7/14*       (2006.01)
*H02J 7/08*       (2006.01)

(52) U.S. Cl.
CPC .......... *H02J 7/0068* (2013.01); *H02J 7/0029* (2013.01); *H02J 7/0032* (2013.01); *H02J 7/0063* (2013.01);

(Continued)

(58) Field of Classification Search
USPC .................. 320/132, 121, 128, 134, 136
See application file for complete search history.

(56) References Cited

U.S. PATENT DOCUMENTS 6,388,854 B1 * 5/2002 Berstis .................. H02H 11/00
                                                       307/141
8,896,140 B2 * 11/2014 Venkatasubramaniam .................
                                                       F02N 11/0859
                                                       290/31
(Continued)

FOREIGN PATENT DOCUMENTS

DE    102012223482    6/2014
DE    102013202280    8/2014
(Continued)

OTHER PUBLICATIONS

International Search Report for Application No. PCT/EP2015/079919 dated Mar. 18, 2016 (English Translation, 2 pages).

*Primary Examiner* — Alexis B Pacheco
(74) *Attorney, Agent, or Firm* — Michael Best & Friedrich LLP

(57) ABSTRACT

The invention relates to a battery cell unit (10) which comprises a rechargeable electrochemical battery cell (11), a monitoring-and-control unit (12) connected in parallel to said battery cell (11), and a coupling unit in the form of a half bridge (14) comprising a first power semi-conductor (15) and a second power semi-conductor (16). Said battery cell unit (10) is equipped with an integrated circuit (20) that has a noise source (21). A switch-on delay can be achieved by means of said noise source (21). The invention also relates to a switching method for a battery system which comprises a plurality of intrinsically-safe battery cell units (10).

10 Claims, 3 Drawing Sheets

(52) U.S. Cl.
CPC ......... *H02J 7/087* (2013.01); *H02J 2007/004* (2013.01); *H02J 2007/0037* (2013.01); *H02J 2007/0067* (2013.01)

(56) References Cited

U.S. PATENT DOCUMENTS

| | | | |
|---|---|---|---|
| 2010/0225267 A1 | 9/2010 | Elhalis | |
| 2012/0019209 A1* | 1/2012 | Fink | H01M 10/425 320/116 |
| 2012/0242156 A1* | 9/2012 | Butzmann | H02J 7/0013 307/82 |
| 2012/0274140 A1 | 11/2012 | Ganor | |
| 2012/0293128 A1 | 11/2012 | Kim et al. | |
| 2014/0132203 A1* | 5/2014 | Schillinger | H02J 7/04 320/107 |
| 2014/0266064 A1* | 9/2014 | Fink | H02J 7/0026 320/136 |
| 2015/0214757 A1* | 7/2015 | Zane | H02J 7/0021 320/107 |
| 2016/0065073 A1* | 3/2016 | Katsuki | H02M 3/158 323/271 |
| 2016/0301251 A1* | 10/2016 | Cho | H02J 50/90 |
| 2016/0339858 A1* | 11/2016 | Fink | B60R 16/033 |
| 2016/0348633 A1* | 12/2016 | Skowronek | F02P 3/0407 |
| 2017/0001585 A1* | 1/2017 | Fink | B60L 11/1855 |
| 2017/0033409 A1* | 2/2017 | Wolff | H01M 10/0525 |
| 2018/0212510 A1* | 7/2018 | Takahashi | H02M 1/083 |

FOREIGN PATENT DOCUMENTS

| | | |
|---|---|---|
| DE | 102013204523 | 9/2014 |
| DE | 102013204538 | 9/2014 |
| DE | 102013209383 | 11/2014 |
| JP | H03106353 U | 11/1991 |
| JP | H07327992 A | 12/1995 |
| JP | 2007258836 A | 10/2007 |

* cited by examiner

SWITCH-ON DELAY FOR INTRINSICALLY-SAFE BATTERY CELLS

BACKGROUND OF THE INVENTION

The present invention relates to rechargeable battery cell units which can be interconnected to form a battery module, and particularly to an intrinsically-safe battery cell unit comprising a switch-on delay and a switching method for intrinsically-safe battery cells.

High-performance rechargeable battery modules, typically consisting of a plurality of battery cells electrically connected to one another, are an important component of the electric and hybrid vehicle technology. Particularly the requirements for performance and safety of battery systems, which can consist of a plurality of battery modules interconnected with one another and therefore a relatively high number of battery cells, belong to the challenges of the development of storage battery technologies. Lithium-ion cells are increasingly used in the automobile industry. Lithium-ion batteries are however relatively sensitive with regard to overcharging as well as deep discharging.

In order to increase the reliability primarily of lithium-ion batteries, intrinsically-safe battery cells and battery modules are desirable, which can protect themselves from inadmissible electrical operating conditions by means of the electronics associated therewith, without being dependent on the function of electronics of a battery management system. Intrinsically-safe battery cells should be short-circuit proof, non-combustible and non-explosive and also not trigger any exothermal reactions, in English language usage also known as "thermal runaway". Intrinsically-safe battery cells are known, for example, from the prior art, which have electronic components, such as, for example, an ultrafast discharge circuit which protects the battery from breakdowns, such as internal or external short circuits, overloading, deep discharge or inadmissible external heating.

In order to achieve a certain value of the total voltage of a battery module or a battery system according to the current prior art, a plurality of electrically intrinsically-safe battery cells, which are either connected in series and/or in parallel with one another, are switched on by a superordinate control unit, for example a battery management system, corresponding to a predetermined probability. In order to maximize the performance of the individual battery cells and to increase the service life thereof, the individual battery cells are equipped with electronics in order to determine the intrinsic state conditions and to accordingly carry out an intrinsic switching state. The prioritization of the use of the battery cells typically occurs either according to the charge state of the individual battery cells, also denoted in English language usage as state of charge (SOC), or according to the ageing of individual battery cells, which is denoted as state of health (SOH) in the English language usage. In order to implement this switching method, each individual battery cell, according to the prior art, is equipped with a microprocessor unit, which in English language usage is also referred to as a micro-control unit (MCU), which determines the switching probability of the corresponding battery cell. This requires significant technical effort and expense and furthermore stresses the battery management system and in particular the information density of the communication bus.

The American patent application US 2012/0274140A1 discloses a battery system which has a switching device that is connected to a control unit. The switching device comprises a plurality of battery cells and a wiring which allows the control unit to change the configuration of the individual battery cells in the battery module. In so doing, the state of charge and the ageing of the individual battery cells, the past history of the battery module as well as environmental conditions and manufacturing specifications can be taken into account. With the aid of the switching device, the output voltage of the battery module can be adapted to the requirements of a consumer, for example an electric motor.

The switching methods for battery cells or battery modules known from the prior art have a relatively high complexity, which impairs the efficiency and leads to a strong utilization of the communication bus between the individual battery cells and the battery management system. An overloading of the communication bus can result in delays when switching on and off the battery cells of a battery module or battery system. As a result, the accuracy of the control for setting a certain nominal voltage can be impaired.

In front of this background, it is an aim of the present invention to improve the switching capacity of intrinsically-safe battery cells, in particular of lithium-ion battery cells, in particular with regard to the reduction in the complexity of the battery module or battery system with regard to the information load on the communication bus between the individual battery cells and the battery management system.

SUMMARY OF THE INVENTION

In order to meet this aim, an intrinsically-safe battery cell unit having a switch-on delay according to the invention and a switching method for intrinsically-safe battery cell units according to the invention are proposed.

Provision is accordingly made in the invention for a battery cell unit which comprises a rechargeable electrochemical battery cell, a monitoring-and-control connected in parallel to said battery cell and a coupling unit in the form of a half bridge comprising a first power semi-conductor and a second power semiconductor. The battery cell unit is equipped with an integrated circuit that has a noise source. A switch-on delay can be achieved by means of said noise source.

The intrinsically-safe battery cell unit according to the invention has the advantage with respect to the prior art that a microprocessor unit used to date for switching methods can be replaced by an integrated circuit having a noise source and thus reduce the costs and the complexity of a battery system. Software and processor chips are no longer needed. By using an integrated circuit instead of a microprocessor unit, the data load on the communication bus, which connects the individual battery cell units to a battery management system, is reduced. By the use of a noise source for generating an individual switch-on delay of intrinsically-safe battery cell units, the frequency of the activation or respectively deactivation of a battery cell unit can be increased and the nominal voltage of a battery module or respectively a battery system, which comprises a plurality of battery cell units according to the invention can furthermore be set more precisely.

Provision is made in an advantageous embodiment of the invention for the noise source to be an induction coil and in particular a small signal induction coil. By replacing relatively simple components, the costs and the complexity of the battery cell unit according to the invention can be reduced.

Provision is made in a further advantageous embodiment of the invention for a plurality of battery cell units to be interconnected with one another to form a battery module, wherein the switch-on delay can be individually set for the individual battery cell units. Battery systems, in which significantly smaller demands are placed on the associated battery management system, can be constructed with the battery cell unit according to the invention. In so doing, flexible and customer specific battery modules or respectively battery systems are made possible.

Provision is made according to a preferred embodiment of the invention for different voltage characteristic curves of the battery cell unit and thus different switch-on instants to be generated by means of different voltages of the noise source. As a result, the frequency of the activation or respectively the deactivation of a battery cell unit can be increased and the nominal voltage of a battery module or respectively a battery system, which comprises a plurality of battery cell units according to the invention, can be more precisely set.

According to a further preferred embodiment of the invention, provision is made for a threshold voltage $U_1$ to be predetermined, which determines the point in time of the switching on or respectively switching off of the battery cell unit. Provision is furthermore made for the battery cell unit to be able to be switched on when the threshold voltage $U_1$ has been exceeded and to be switched off when the threshold voltage $U_1$ has been undershot. In so doing, the battery cell state of the battery cells of the battery cell units, in particular the state of charge or the ageing state, can be taken into account when switching the battery cell units. This can lead to an extension of the service life and to an increase in the performance of the individual battery cells.

A further advantageous embodiment of the invention provides that the battery cell is a lithium-ion battery cell. Lithium-ion battery systems currently offer the best development chances for the success of hybrid and electric cars.

Provision is made in a further advantageous embodiment of the invention for a first diode to be connected in parallel to the first power semiconductor and for a second diode to be connected in parallel to the second power semiconductor, wherein the first power semiconductor and the first diode form a first power semiconductor switch and the second power semiconductor and the second diode form a second power semiconductor switch. By replacing the power electronics, the battery cell unit according to the invention can be controlled flexibly. Furthermore, power electronic systems have the advantage that said systems have high degrees of efficiency.

In order to meet the aim mentioned above, the invention furthermore relates to a switching method for a battery system, which comprises a plurality of intrinsically-safe battery cell units that each have a rechargeable electrochemical battery cell, a monitoring-and-control unit connected in parallel to said battery cell and a coupling unit in the form of a half bridge comprising a first power semi-conductor and a second power semi-conductor, said switching method being characterized in that an individual switch-on delay is implemented by integrating a noise source into each individual battery cell unit for each individual battery cell unit.

BRIEF DESCRIPTION OF THE DRAWINGS

Further advantageous details, characteristics and design specifics of the invention are explained in detail in connection with the exemplary embodiments depicted in the figures of the drawings.

In the drawings.

DETAILED DESCRIPTION

Figure 1:
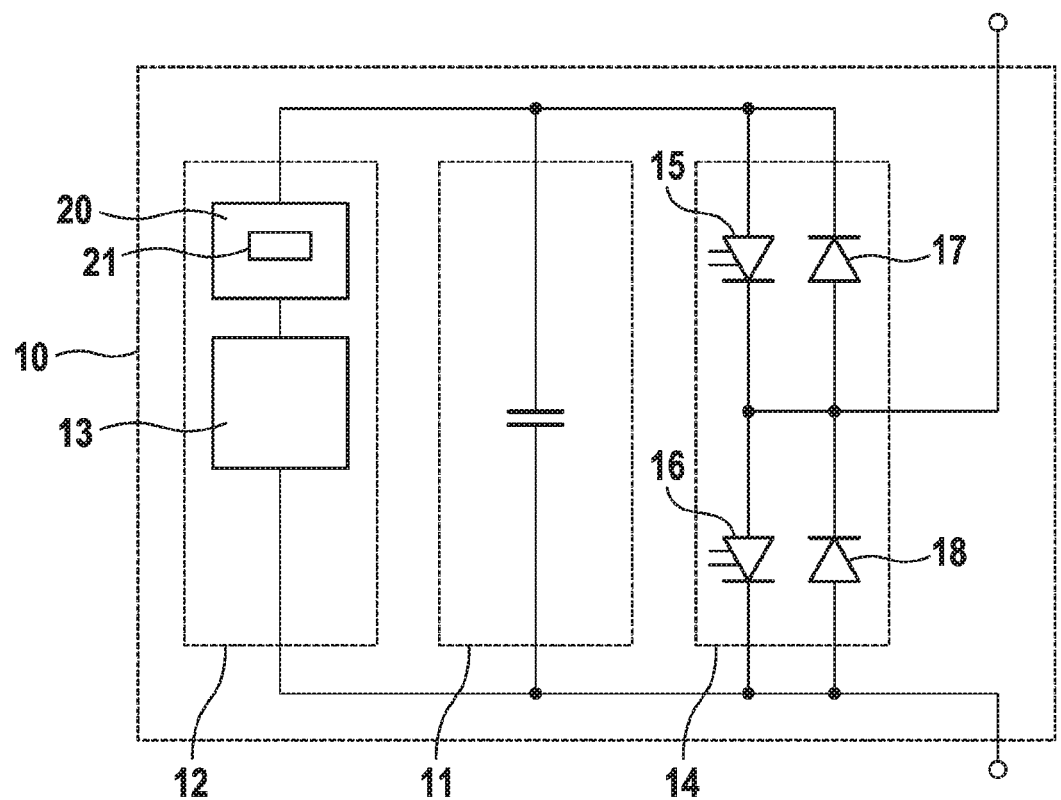
FIG. 1 shows in a schematic depiction an exemplary embodiment for an intrinsically-safe battery cell unit according to the invention.

In FIG. 1, the basic schematic diagram of an intrinsically-safe battery cell unit 10 is depicted in accordance with an embodiment of the invention. The electrically intrinsically-safe battery cell unit 10 comprises an electrochemical battery cell 11, in particular a lithium-ion battery cell, and a monitoring-and-control unit 12 connected in parallel to said battery cell 11. The monitoring-and-control unit 12 has monitoring electronics 13 for monitoring the battery cell 11. In addition, the monitoring-and-control unit 12 can, for example, comprise a sensor device for acquiring physical values, a state determination device (battery cell state detection and prediction), which detects the current battery cell state from the sensor signals particularly with regard to the safety and reliability thereof and can also forecast or respectively predict the future behavior of the battery cell and an actuating device (safety actuator technology), with which the battery cell 11 can be transferred into a safe operating mode upon detecting a battery cell state that has become critical.

A discharge device 11 (not separately depicted) can be disposed in the battery cell unit 11, which discharge device can be activated by means of the actuating device. The discharge device is provided for the purpose of discharging the battery cell 11 by means of moderate discharge currents in an activated discharge mode and/or of discharging the battery cell 11 by means of high discharge currents close to the short circuit during an activated fast discharge mode. In addition, safety functions, for example a deep discharge safety function, can be integrated into the battery cell unit 10, said safety functions being provided by the monitoring-and-control device 12 and being able to immediately transfer the battery cell 11 into a safe operating mode when a critical battery cell state or one that is becoming critical is present.

The battery cell unit 10 further has a coupling unit which is in the form of a half bridge comprising a first power semi-conductor 15 and a second power semi-conductor 16. The power semi-conductors 15 and 16 can, for example, be transistors. A first diode 17 is connected in parallel to the first power semi-conductor 15, and a second diode 18 is connected in parallel to the second power semi-conductor 16. The diodes 17 and 18 are preferably free-wheeling diodes. The forward-bias direction of the diodes 17 and 18 runs against the forward-bias direction of the corresponding power semi-conductor 15 or respectively 16. The first power semi-conductor 15 and the first diode 17 form a first power semi-conductor switch and the second power semi-conductor 16 and the second diode 18 form a second power semi-conductor switch.

The half bridge 14 is connected to the plus pole of the battery cell 11 at a first connection that is associated with the first power semi-conductor 15 and to the minus pole of the battery cell 11 at a second connection that is associated with the second power semi-conductor 16. The half bridge 14 is furthermore connected at a middle connection to a first output terminal of the battery cell unit 10. According to the invention, the monitoring-and-control unit 12 is equipped with an integrated control for the power semi-conductors 15 and 16.

During normal operation, the battery cell 10 is switched on by means of the upper part of the half bridge 13, i.e. the first power semi-conductor switch formed by the first power semi-conductor 15 and the first diode 17, and switched off by means of the lower part of the half bridge 14, i.e. the second power semi-conductor switch formed by the second power semi-conductor 16 and the second diode 18.

If the battery cell 10 achieves a certain battery cell state, such as, for example, a predetermined, minimum voltage value, up to which the battery cell 11 can be discharged, or a predetermined maximum voltage value, up to which the battery cell 11 can be charged, the upper part of the half bridge 14 and thus the first power semi-conductor switch is switched off, whereas the lower part of the half bridge 14 and thus the second power semiconductor switch is switched on.

A plurality of intrinsically-safe battery cell units 10 can either be interconnected with one another in series and/or in parallel and thus for a battery module or respectively battery system. In order to achieve a certain value of the total voltage of such a battery module or battery system, the intrinsically-safe battery cell units 10 are switched on or switched off by a superordinate central control unit, for example a battery management system, in accordance with a predetermined probability.

In order to maximize the performance of the individual battery cells 11 and increase the service life thereof, the individual battery cell units 10 are equipped with electronics in order to determine the intrinsic state conditions and to accordingly carry out an intrinsic switching state. The prioritization of the use of the battery cell units 10 typically occurs either in accordance with the charge state of individual battery cells 11, which is also know in the English language usage as state of charge (SOC), or to the ageing of individual battery cells 11, which is also referred to in English as state of health (SOH).

In order to implement this switching method, the battery cell unit 10 according to the invention is equipped with an integrated circuit, for example a logic circuit, which has noise circuit. The logic circuit can operate autonomously after said circuit has received the enable signal. The noise source 21 is preferably an induction coil and in particular a small signal induction coil. It is possible with the aid of a small signal induction coil to generate clear switch-on delays between individual battery cell units 10. According to one embodiment, the integrated circuit 20 can be integrated into the monitoring-and-control unit. With the aid of the noise source 21, a switch-on delay is achieved which can be individually set for each battery cell unit 10. In so doing, flexible and customer specific battery modules or battery systems are made possible.

Figure 2:
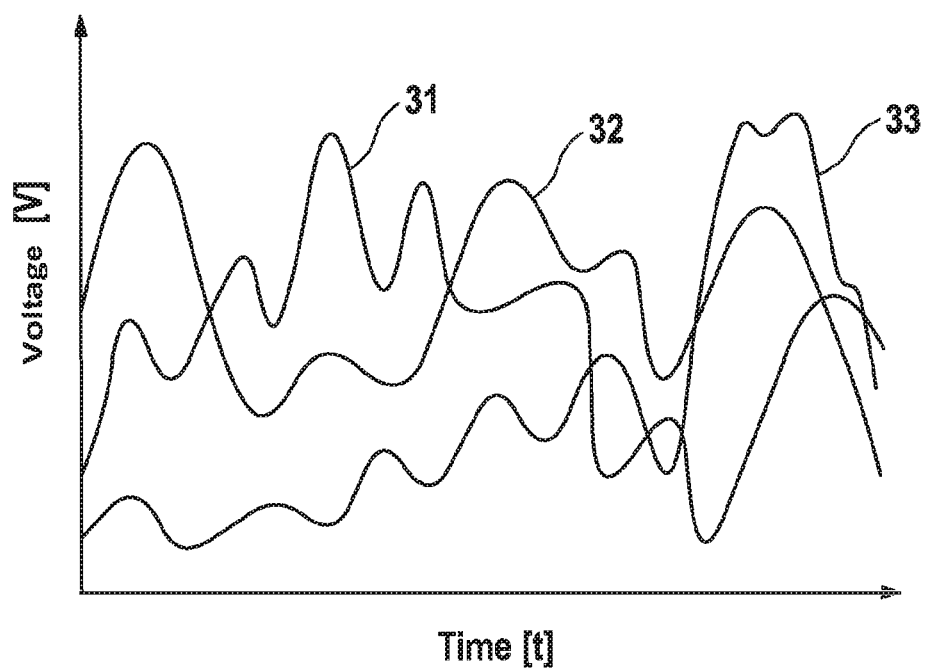
FIG. 2 shows in a schematic depiction the voltage characteristic curves of different, inventive, intrinsically-safe battery cell units as a function of the voltage of the noise source.

In FIG. 2, the voltage characteristic curves of different, inventive, intrinsically-safe battery cell units 31, 32 and 33 are depicted as a function of the voltage of the noise source 21. The intrinsically-safe battery cell units 31, 32, and 33 correspond in the construction thereof to the previously described intrinsically-safe battery cell unit 10. As can be seen from FIG. 2, it is possible to generate different characteristic curves in the individual battery cell units 31, 32 and 33 with different voltages of the noise source 21 and thus different switch-on instants for the individual battery cell units 31, 32, and 33.

Figure 3:
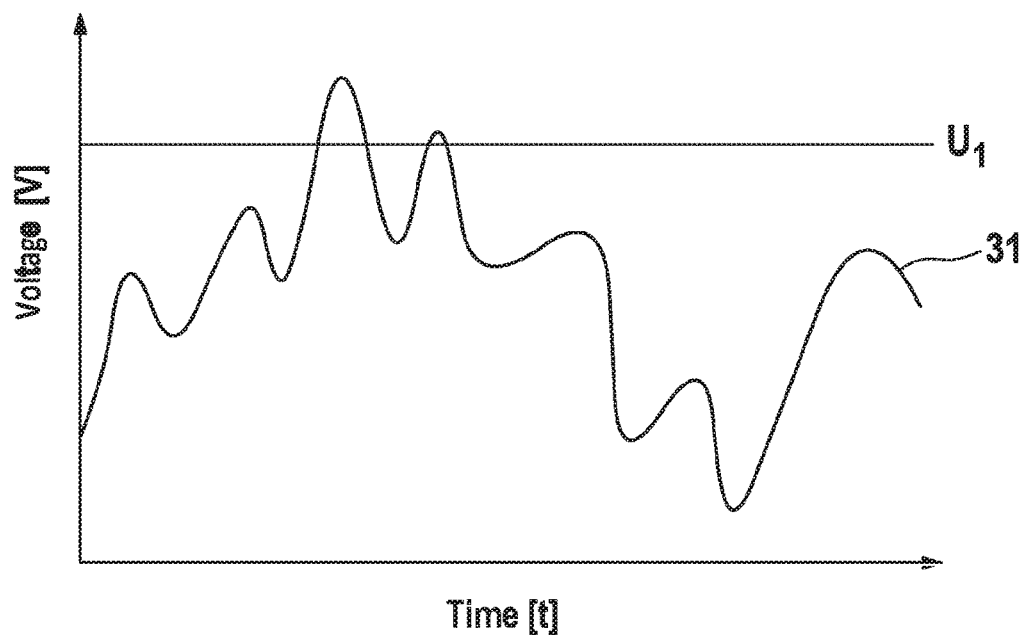
FIG. 3 shows in a schematic depiction a threshold voltage for an intrinsically-safe battery cell unit according to the invention.

In FIG. 3, a threshold voltage for an inventive, intrinsically-safe battery cell unit 31 is shown. In addition to generating a switch-on delay with the aid of the noise source 21 which simplifies and optimizes the switching of a plurality of battery cell units 31, 32, and 33, a threshold voltage can be determined for each individual battery cell unit. In FIG. 3, the threshold voltage $U_1$ is depicted for the battery cell unit 31. The threshold voltage $U_1$ is determined when the battery cell unit 31 is switched on or off. If the threshold voltage $U_1$ is exceeded, the battery cell unit 31 is switched on; and if the threshold value $U_1$ is undershot, the battery cell unit 31 is switched off.

Figure 4:
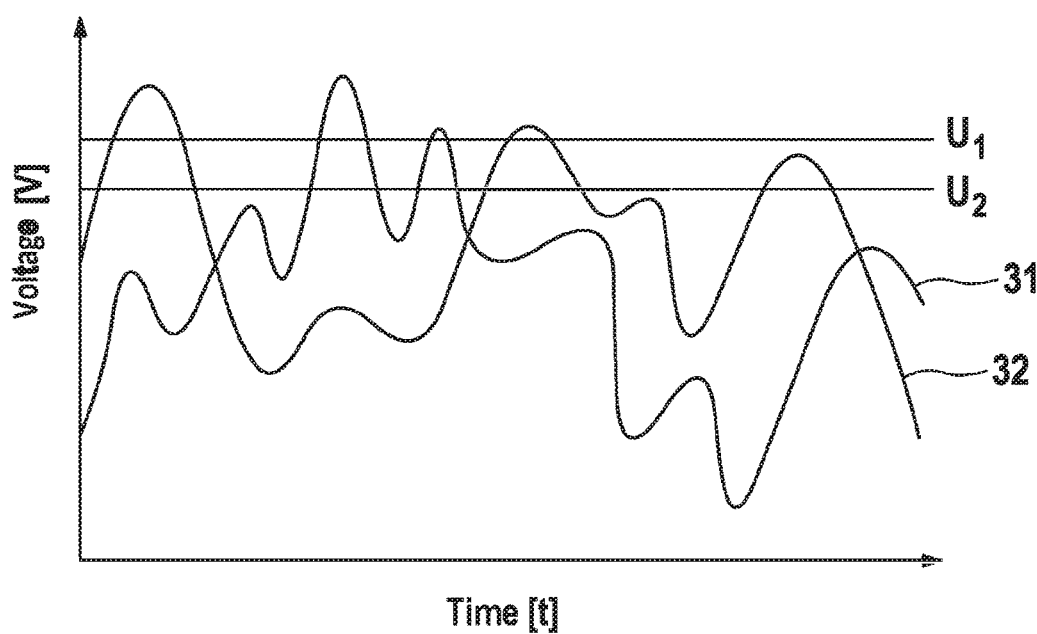
FIG. 4 shows in a schematic depiction individual threshold voltages of individual, inventive, intrinsically-safe battery cell units.

As can be seen in FIG. 4, the threshold voltage can be determined for each individual battery cell unit. FIG. 4 shows the individual threshold voltages $U_1$ and $U_2$ for the corresponding individual battery cell units 31 and 32. A criterion for determining or setting the individual threshold voltages $U_1$ and $U_2$ can, for example, be the battery cell state of the battery cells 11 of the battery cell units 31 and 32, in particular the state of charge and/or the ageing state of a battery cell unit. Accordingly, if the state of charge and/or the ageing state of a battery cell unit is high, the threshold voltage is set low and thus a short switch-on delay is made possible.

By means of the use of a noise source 21 to generate an individual switch-on delay of intrinsically-safe battery cell units 10, the costs and the complexity of a battery system can be reduced, whereas the frequency of the activation or respectively deactivation of a battery cell unit 10 can be increased. In addition, the nominal voltage of a battery module or battery system, which comprises a plurality of battery cell units 10, can be more precisely set due to a reduction in the data load on the communication bus which connects the individual battery cell units 10 to a battery management system.

The battery cell unit 10 according to the invention is not limited to the use of lithium-ion battery cells and can also be used for other battery cell technologies, such as, for example, nickel metal hydride battery cells.

The exemplary embodiments depicted in the figures and explained in connection with the same are used to explain the invention and do not restrict the same.

The invention claimed is:

1. A battery cell unit (10) which comprises a rechargeable electrochemical battery cell (11), a monitoring-and-control unit (12) connected in parallel to said battery cell (11) and a coupling unit in the form of a half bridge (14) comprising a first power semi-conductor (15) and a second power semi-conductor (16), wherein the battery cell unit (10) is equipped with an integrated circuit (20) that has a noise source (21), by means of which a switch-on delay can be implemented.

2. The battery cell unit (10) according to claim 1, wherein the noise source (21) is an induction coil.

3. The battery cell unit (10) according to claim 1, wherein the noise source (21) is a small signal induction coil.

4. The battery cell unit (10) according to claim 1, wherein a plurality of battery cell units (10) can be interconnected among one another to form a battery module, wherein the switch-on delay can be individually set for the individual battery cell units (10).

5. The battery cell unit (10) according to claim 1, wherein different voltage characteristic curves of the battery cell unit (10) and thus different switch-on instants can be generated by means of different voltages of the noise source (21).

6. The battery cell unit (10) according to claim 1, wherein a threshold voltage $U_1$ can be set, which determines the point in time of the switching on or respectively switching off of the battery cell unit (10).

7. The battery cell unit (10) according to claim 6, wherein the battery cell unit (10) can be switched on when the threshold voltage $U_1$ has been exceeded and switched off when the threshold voltage $U_1$ has been undershot.

8. The battery cell unit (10) according to claim 1, wherein the battery cell (11) is a lithium-ion battery cell.

9. The battery cell unit (10) according to claim 1, wherein a first diode (17) is connected in parallel to the first power semi-conductor (15) and a second diode (18) is connected in parallel to the second power semi-conductor (16), wherein the first power semi-conductor (15) and the first diode (17) form a first power semi-conductor switch and the second power semi-conductor (16) and the second diode (18) form a second power semi-conductor switch.

10. A switching method for a battery system which comprises a plurality of intrinsically-safe battery cell units (10), which in each case have a rechargeable electrochemical battery cell (11), a monitoring-and-control unit (12) connected in parallel to said battery cell (11) and a coupling unit in the form of a half bridge (14) comprising a first power semi-conductor (15) and a second power semi-conductor (16), wherein an individual switch-on delay is implemented for each individual battery cell unit (10) by integrating a noise source into each individual battery cell unit (10).

* * * * *